United States Patent [19]
Gilbert et al.

[11] Patent Number: 6,005,847
[45] Date of Patent: Dec. 21, 1999

[54] METHOD AND APPARATUS FOR FACILITATING COMMUNICATION BETWEEN MULTIPLE PLATFORMS VIA SINGLE, MULTI-CHANNEL COMMUNICATION CONDUIT

[75] Inventors: Leroy E. Gilbert, Wellington, Fla.; William J. Beyda, Cupertino, Calif.; Selena Dilley, San Jose, Calif.; Shmuel Shaffer, Palo Alto, Calif.

[73] Assignee: Siemens Information and Communications Network, Inc., Boca Raton, Fla.

[21] Appl. No.: 08/888,761

[22] Filed: Jul. 7, 1997

[51] Int. Cl.⁶ .............................. H04L 12/66; H04M 3/42
[52] U.S. Cl. ...................... 370/264; 370/352; 370/463; 379/208
[58] Field of Search .................................... 370/522, 524, 370/419, 420, 431, 259, 260, 264, 463, 352; 379/90.01, 93.05–93.07, 212, 215, 208

[56] References Cited

U.S. PATENT DOCUMENTS

| | | | |
|---|---|---|---|
| 4,996,685 | 2/1991 | Farese et al. | 370/352 |
| 5,184,348 | 2/1993 | Abdelmouttalib | 370/431 |
| 5,210,741 | 5/1993 | Grochmal | 370/362 |
| 5,267,245 | 11/1993 | Maruyama et al. | 370/359 |
| 5,408,528 | 4/1995 | Carlson | 379/211 |
| 5,426,634 | 6/1995 | Cote et al. | 370/360 |
| 5,463,629 | 10/1995 | Ko | 370/463 |
| 5,812,535 | 9/1998 | Hallock et al. | 370/264 |
| 5,812,656 | 9/1998 | Garland et al. | 379/208 |

*Primary Examiner*—Chau Nguyen
*Assistant Examiner*—John Pezzlo

[57] ABSTRACT

Methods and apparatus are described for facilitating multiple data communications with a first platform (100, 102, and 104) using a single communication conduit (108) having first and second channels. First data are transmitted between the first platform and a second platform (114) via the first and second channels (202). It is determined whether an incoming call comprises second data of a particular type (206). Where the incoming call comprises the second data of the particular type (208), transmission of the first data via the second channel is inhibited (226) thereby enabling reception of the second data by the first platform via the second channel while the first data continue to be transmitted via the first channel. The second data are then received at the first platform via the second channel (230). Transmission of the first data via the first and second channels is resumed in response to termination of transmission of the second data (266).

19 Claims, 4 Drawing Sheets

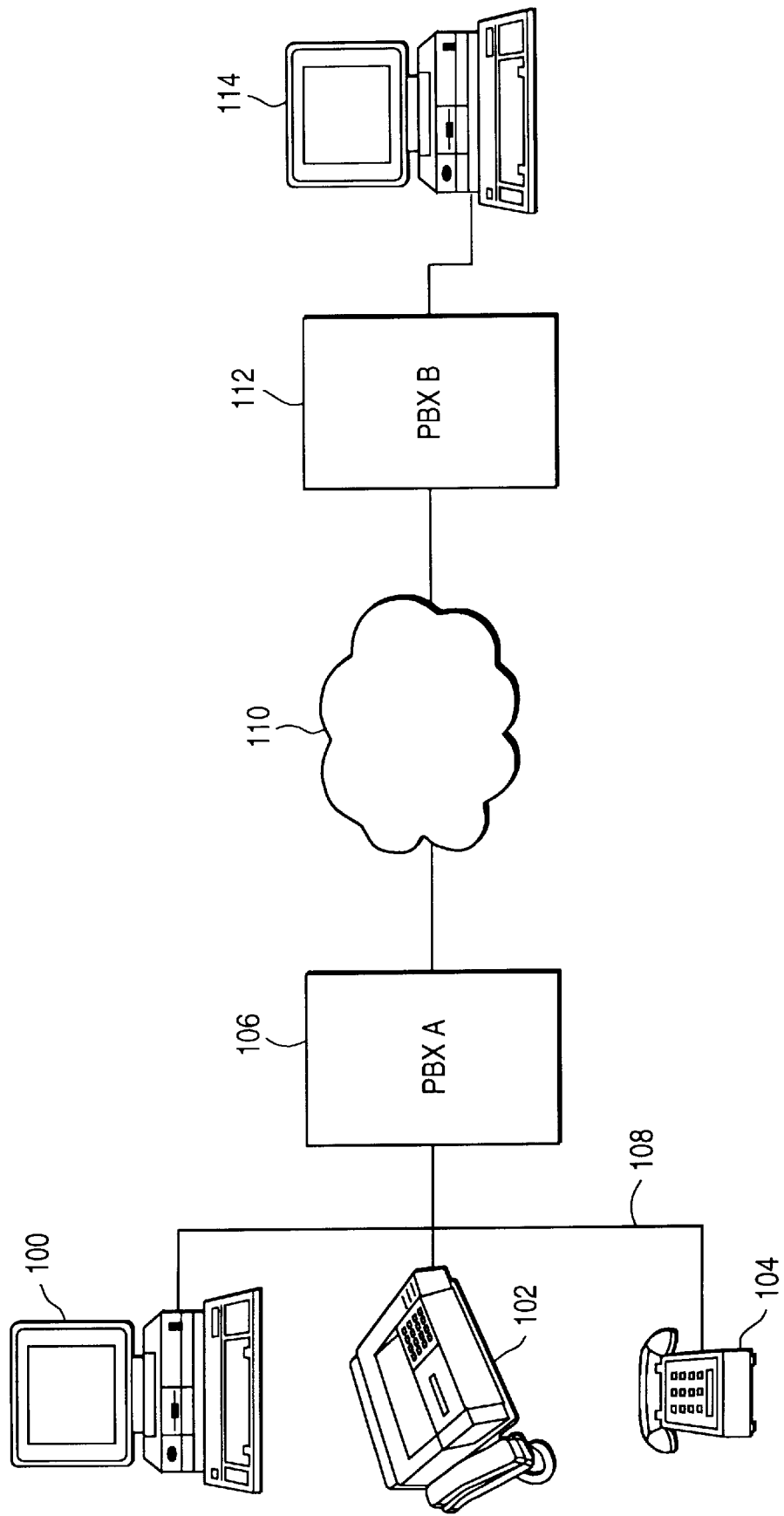
FIG_1

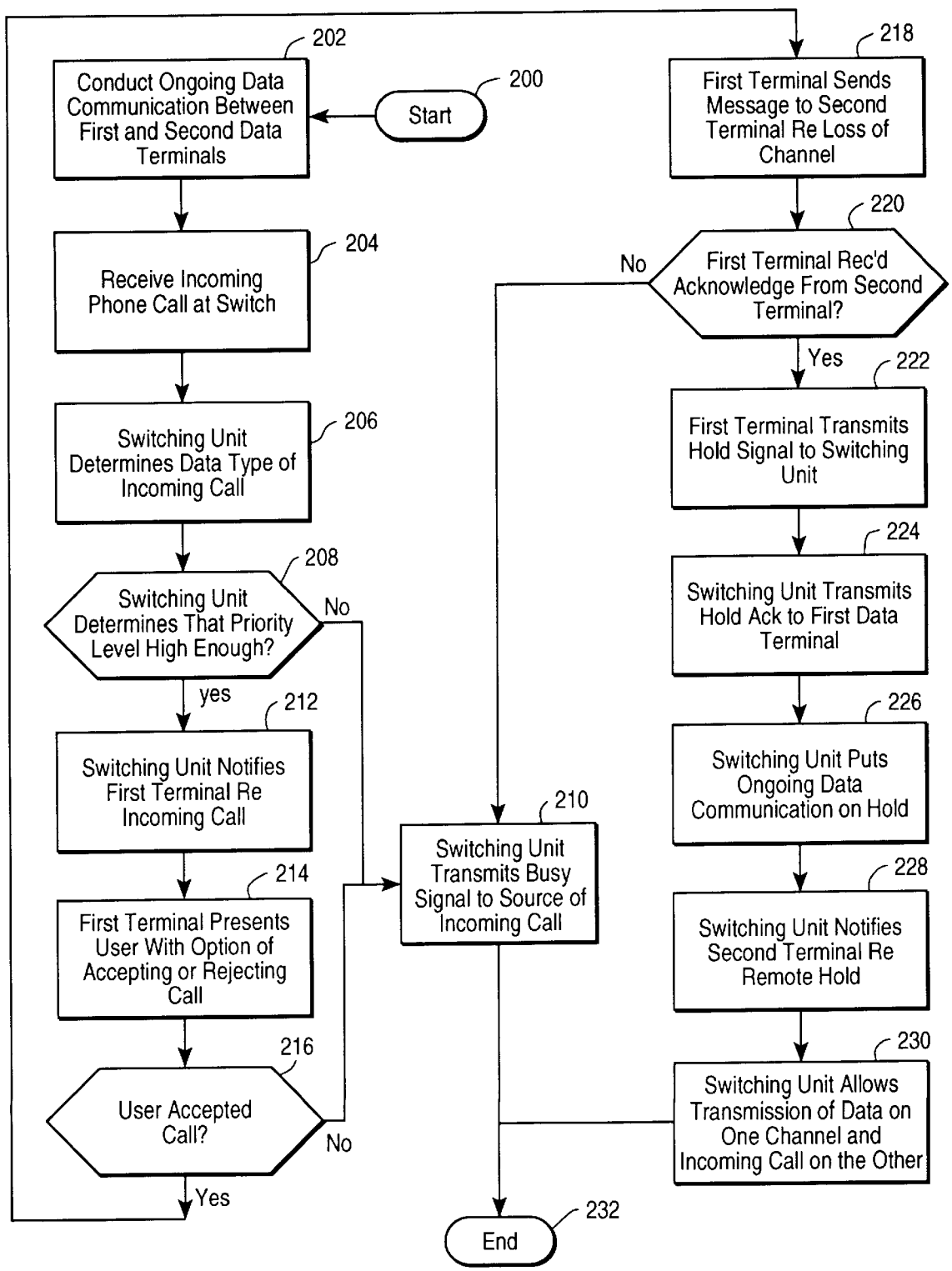
FIG_2A

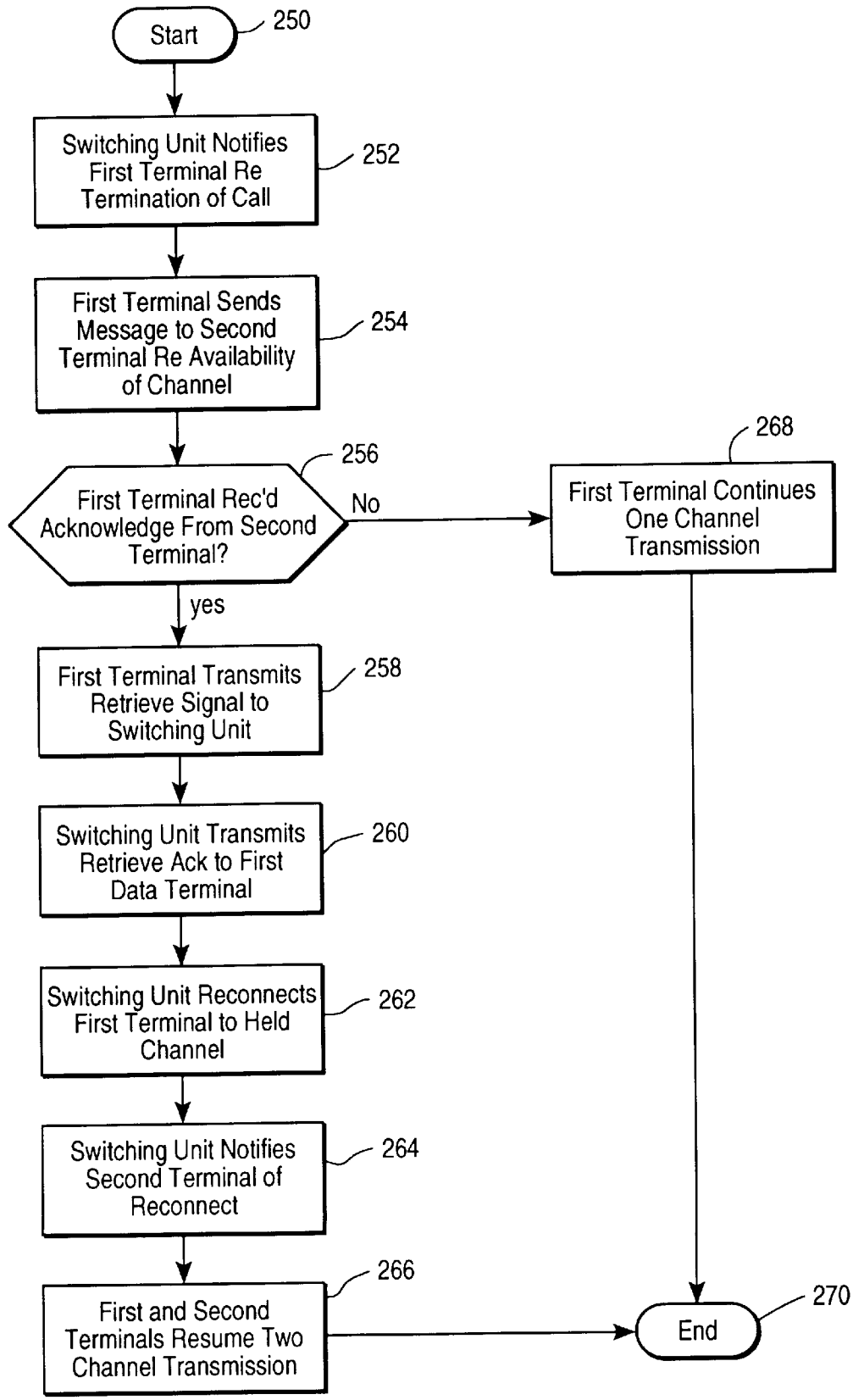
FIG_2B

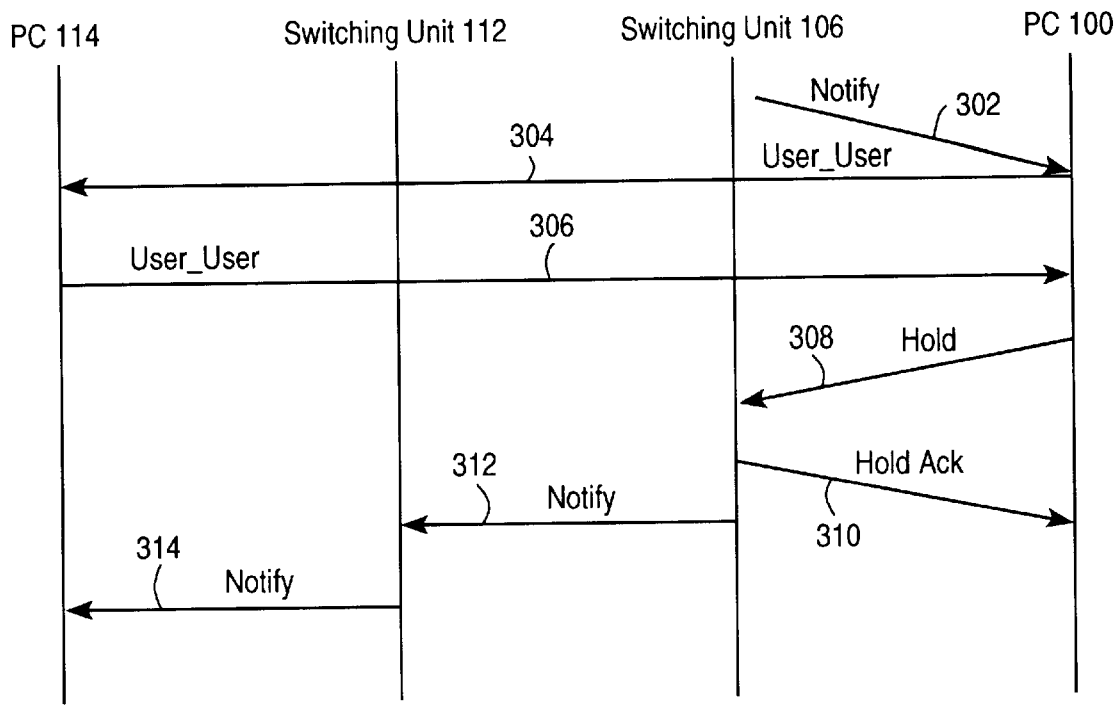
FIG_3A
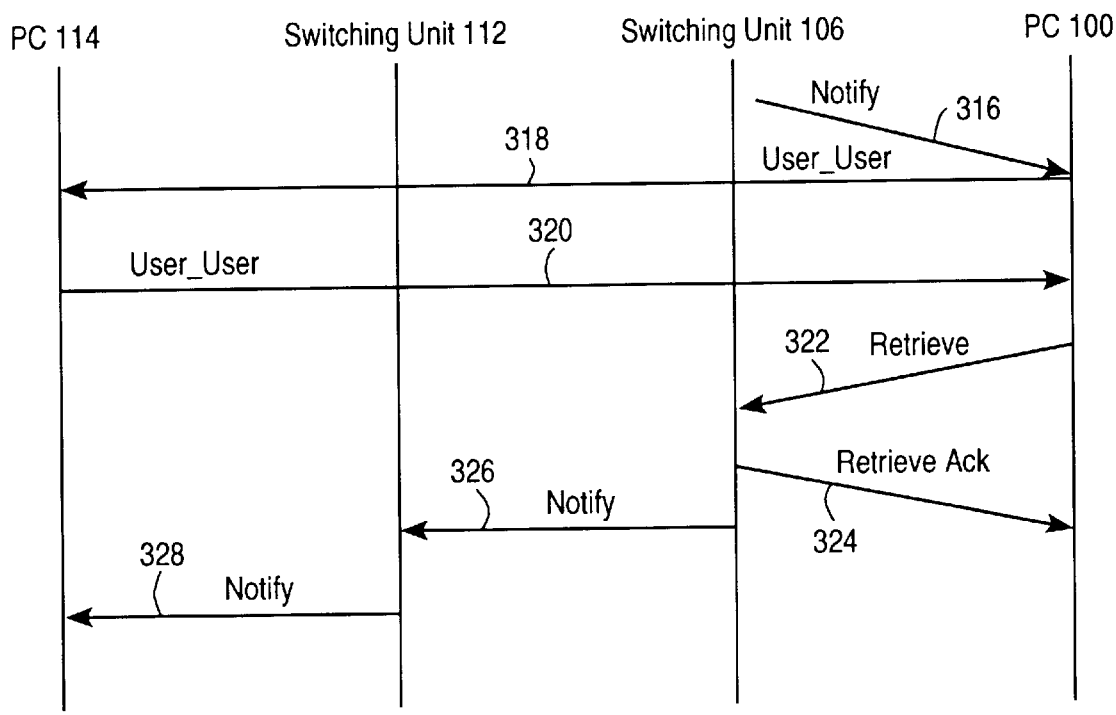
FIG_3B

METHOD AND APPARATUS FOR FACILITATING COMMUNICATION BETWEEN MULTIPLE PLATFORMS VIA SINGLE, MULTI-CHANNEL COMMUNICATION CONDUIT

BACKGROUND OF THE INVENTION

The present invention relates to methods and apparatus for allowing one platform to communicate with multiple platforms using a single multi-channel communication conduit. More specifically, one embodiment of the present invention allows a user to configure his system to arbitrate between incoming calls on a single two-channel ISDN line to which multiple devices are connected. This enables, for example, voice calls destined for a telephone to be received when both channels are being used for data transfer by a personal computer.

Currently, many home offices have more than one device (e.g., telephone, fax machine, PC) connected to a single basic rate interface such as, for example, an ISDN line. If one of the devices, e.g., a PC, is engaged in a data transfer which uses both channels of the ISDN line, an incoming call intended for the telephone or fax machine receives a busy signal and is not able to be connected. It is not difficult to appreciate the undesirable consequences resulting from frequent conflicts such as this.

Home office routers provide a means for receiving such calls by dropping any current two-channel data communication down to one of the channels and transmitting the incoming call on the other. This is done automatically without regard to the data types or importance of the communications. Unfortunately, while this solution addresses the problem of missing important voice and fax communications, it assumes the desirability of allowing any incoming communication to interrupt any ongoing two-channel data communication. Such a protocol may be particularly undesirable if the ongoing two-channel data communication is an important real-time video conference call, the fidelity of which may be unacceptably affected by the process of dropping one of the two channels in favor of an incoming call.

It is therefore apparent that there is a need for a more intelligent way to arbitrate between incoming calls and ongoing data communications for use of the transmission resources of basic rate interfaces.

SUMMARY OF THE INVENTION

According to the present invention, methods and apparatus are provided by which the user of a system may configure the system to arbitrate between incoming calls and ongoing data communications in a way that is appropriate to the individual user's priorities. According to a specific embodiment, the user may assign priorities to different types of data communication to ensure that ongoing data communications are only interrupted by incoming calls of higher priority. For example, a user might assign the highest of three priority levels to real-time, two-way video communications. The user then might assign the next highest priority level to real-time voice communications (e.g., telephone calls), and the lowest priority level to any other standard two-channel data communication.

Thus, if the user were using both channels of the ISDN line to browse the web, he would receive notification of an incoming telephone call in response to which he could confine the Internet communication to one of the channels and allow the telephone call to be transmitted on the other. This could also be transparent to the user, i.e., done automatically. If however, the user were engaging in a two-way video communication, he would not be notified of the incoming telephone call, the incoming call would experience a busy signal, and the ongoing video communication would continue uninterrupted. According to specific embodiments, the user is not notified and the arbitration takes place automatically.

Thus, according to the invention methods and apparatus are described for facilitating multiple data communications with a first platform using a single communication conduit having first and second channels. First data are transmitted between the first platform and a second platform via the first and second channels. It is then determined whether an incoming call comprises second data of a particular type. Where the incoming call comprises the second data of the particular type, transmission of the first data via the second channel is inhibited thereby enabling reception of the second data by the first platform via the second channel while the first data continue to be transmitted via the first channel. The second data are then received at the first platform via the second channel. Transmission of the first data via the first and second channels is resumed in response to termination of transmission of the second data.

A further understanding of the nature and advantages of the present invention may be realized by reference to the remaining portions of the specification and the drawings.

BRIEF DESCRIPTION OF THE DRAWINGS

FIG. 1 is a block diagram illustrating an environment in which the present invention may be implemented;

FIGS. 2a and 2b are flowcharts illustrating the operation of a specific embodiment of the present invention; and FIGS. 3a and 3b are information flow diagrams illustrating the flow of information in the embodiment of FIGS. 2a and 2b, respectively.

DESCRIPTION OF THE PREFERRED EMBODIMENT

FIG. 1 is a block diagram illustrating an environment in which the present invention may be implemented. A first platform comprises a personal computer 100, a fax machine 102, and a telephone 104. All three of these devices are connected to switching unit 106 via ISDN line 108. Another switching unit 112 is connected to switching unit 106 via some arbitrary network 110 which may be, for example, a local area network (LAN), the vast Internet, or a public switched telephone network (PSTN). Switching units 106 and 112 may be, for example, local PBX switches or remote phone company central office switches depending upon the network environment. Switching unit 112 is connected to personal computer 114.

The operation of a specific embodiment of the invention will now be described with reference to FIGS. 1, 2a, and 3a. For the purpose of this discussion, it will be assumed that a three-level priority hierarchy has been established by the user giving real-time video communication the highest priority, real-time voice communication the second priority, and any other two-way data communications the lowest priority. It will be understood that a priority hierarchy having any number of levels is within the scope of the present invention. For example, a single ISDN line may currently be connected to up to eight end devices while simultaneously communicating with only two. According to the present invention, a user may place each of the eight end devices in a priority hierarchy to minimize the priority problems which might otherwise occur.

Initially, an ongoing two-channel data communication is conducted between personal computers 100 and 114, the first and second data terminals, respectively (step 202). When an incoming call is received by switching unit 106 (step 204), the data type of the incoming call is determined (step 206). Switching unit 106 then determines whether the priority level associated with the data type of the incoming call is high enough (with respect to the ongoing data communication) to notify the user of personal computer 100 of the incoming call (step 208). If not, e.g., the ongoing data communication is a real-time video communication and the incoming call is a voice communication destined for telephone 104, the user is not notified and a busy signal is transmitted to the source of the incoming call (step 210). It will be understood that the transmission of a busy signal in this instance is merely one of a variety of possible responses. Other scenarios within the scope of the invention might include, for example, forwarding the call to a voice messaging system or to an alternate person or number. Therefore, additional references to the use of a busy signal herein may be understood to be one of several possible options.

If, however, the priority of the incoming call is high enough, e.g., the ongoing data communication represents web browsing activity and the incoming call is a telephone call, switching unit 106 sends a Notify signal (arrow 302) to PC 100 indicating the presence of the incoming call (step 212). The Notify signal includes a notification indication information element which identifies the data type of the incoming call. According to a specific embodiment, a dialog box appears on the screen of PC 100 giving the user the option of accepting or rejecting the incoming call (step 214). If the user rejects the incoming call (step 216), a busy signal is transmitted to the source of the incoming call (step 210).

If, on the other hand, the user accepts the incoming call, a requesting User_User message (arrow 304) is sent by PC 100 to PC 114 (step 218) alerting PC 114 to the impending loss of one of the channels. This information is encoded in the message's information element. By using the network signaling resources to transmit User_User messages, the use of in-band resources for this purpose are avoided. In another embodiment, rather than present the user with the option of accepting an incoming call as described above, the acceptance of the incoming call is automatic provided, of course, that the call has an appropriate priority level.

If an acknowledgment of User_User signal 304 is not received from PC 114 (step 220) a busy signal is transmitted to the source of the incoming call (step 210). Alternatively, the user of PC 100 may be presented with a dialog box asking whether the data communication should be conducted on a single channel despite the lack of acknowledgment from PC 114. Upon receiving an acknowledging User_User message (arrow 306) from PC 114 (or upon receiving permission from the user to proceed), PC 100 transmits a Hold signal (arrow 308) to switching unit 106 (step 222), in response to which switching unit 106 transmits a Hold Acknowledge (arrow 310) back to PC 100 (step 224) and places the ongoing data communication on hold thereby releasing one of the two channels for transmission of the incoming call (step 226). The call references and the network connections for the first communication are retained for later reconnection and resumption of two-channel transmission. According to another specific embodiment, rather than putting the first communication on hold, the line is simply disconnected and redialed when the incoming call terminates. Such an embodiment might be more suitable in, for example, a wide area network (WAN) where it might not be appropriate to maintain storage for held calls.

Once a hold has been placed on the first communication (or it has been disconnected), switching unit 106 transmits a Notify signal (arrows 312 and 314) to PC 114 via switching unit 112 with a notification information element indicating the remote hold (step 228). The data transmission between PCs 100 and 114 is then conducted on one channel while the incoming call is transmitted on the other channel (step 230).

The flowchart of FIG. 2b and the information flow diagram of FIG. 3b illustrate the termination of the incoming call and the resumption of two-channel data transmission. When the incoming call has terminated another Notify signal (arrow 316) is sent to PC 100 with the notification information element indicating that the channel is once again available (step 252). PC 100 then transmits another User_User signal (arrow 318) to PC 114 (step 254) requesting a resumption of two-channel transmission. Upon receiving an acknowledging User_User signal (arrow 320) from PC 114 (step 256), PC 100 transmits a Retrieve signal (arrow 322) to switching unit 106 (step 258), in response to which switching unit 106 transmits a Retrieve Acknowledge signal (arrow 324) back to PC 100 (step 260) reconnecting PC 100 to the previously held call (step 262). Switching unit 106 then transmits a Notify signal (arrows 326 and 328) to PC 114 via switching unit 112 with the notification information element indicating that the remote hold had been released (step 264). At this point, both PC 100 and PC 114 would resume transmitting over both channels (step 266). If in step 256 an acknowledge signal is not received from PC 114, single-channel transmission is continued (step 268).

Another embodiment of the invention operates without the User_User signals described above, i.e., arrows 304, 306, 318 and 320. In this embodiment, the change to single-channel transmission is triggered by the Notify message (i.e., arrows 312 and 314) sent after the channel has been placed on hold. Similarly, resumption of two-channel transmission is triggered by the Notify message (i.e., arrows 326 and 328) sent after the held call has been retrieved.

While the User_User signals are not essential for implementation of the invention, they make it possible for relatively intelligent devices to have a more graceful transmission protocol transition when a two-way data communication loses one of its data channels to another call. Provided that the partner device is enabled to utilize such messages, the User_User signals give the partner data terminal advance notice of which data channel will be dropped so that the transmission protocol switch can be done in a synchronized manner. This is particularly useful if the data communication comprises real-time video where such a transmission might result in noticeable loss of individual video frames or loss of synchronization between audio and video. Such synchronization is not particularly useful in a web browsing scenario where, for example, an inefficient transition may simply mean that there is a delay in downloading a web page which is transparent to the user.

Another benefit of the User_User signals is that they prevent the partner data terminal from transmitting packets after the first terminal places the call on hold, thereby eliminating the need to resend data packets. This alleviates an undesirable burden on network bandwidth resources as well as reduces the problems associated with the reordering of packets received out of sequence. Without the User_User signals, the partner data terminal must wait for the Notify signals, i.e., arrows 312 and 314, to know which of the two data channels will be placed on hold.

One of the benefits of this flexibility is that the invention may be implemented without the necessity of modifying end devices to be able to use the User_User signals. That is, the advantages of the invention may be provided to the end user without hardware or software upgrades for any of the devices connected to the user's basic rate interface. Moreover, as devices with this capability become available, the efficiency with which the invention operates may be improved.

While the invention has been particularly shown and described with reference to specific embodiments thereof, it will be understood by those skilled in the art that changes in the form and details of the disclosed embodiments may be made without departing from the spirit or scope of the invention. For example, as discussed above, the invention may be implemented with or without User_User messages. As another example, the hardware configuration of FIG. 1 shows two switching units 106 and 112. As discussed above, these units may comprise PBX switches or phone company central office switches. Additionally, it should be understood that switching units 106 and 112 and network 110 may be replaced by a single switching unit to which all of the devices shown are connected as would be the case, for example, with a local area network. It will also be understood that the protocol described herein may be carried out between the two end platforms without any intervening switching units.

Moreover, various configurations of the end devices may be employed with the present invention. For example, the end devices may be connected in a series configuration, e.g., the ISDN line being piped through the telephone, rather than the parallel configuration shown in FIG. 1. Thus, the present invention may be implemented in any of a wide variety of configurations and environments. Therefore, the scope of the invention should be determined with reference to the appended claims.

What is claimed is:

1. A method for facilitating multiple data communications with a first platform using a single communication conduit, the communication conduit including first and second channels, the method comprising the steps of:

transmitting first data between the first platform and a second platform via the first and second channels;

determining whether an incoming call comprises second data of a particular type;

where the incoming call comprises the second data of the particular type, inhibiting transmission of the first data via the second channel thereby enabling reception of the second data by the first platform via the second channel, the first data continuing to be transmitted via the first channel;

receiving the second data at the first platform via the second channel; and resuming transmission of the first data via the first and second channels in response to termination of transmission of the second data.

2. The method of claim 1 wherein a first interface is associated with the first platform, the inhibiting step comprises the steps of:

transmitting a first notification signal from the first interface to the first platform thereby indicating the second data is available for transmission to the first platform; and in response to the first notification signal, transmitting a hold signal from the first platform to the first interface thereby inhibiting transmission of the first data via the second channel.

3. The method of claim 2 wherein the first data has a first priority associated therewith and the second data has a second priority associated therewith, and wherein the step of transmitting the first notification signal occurs only where the second priority is higher than the first priority.

4. The method of claim 3 wherein the first and second priorities are set by a user of the first platform.

5. The method of claim 2 wherein the particular data type comprises real-time voice data.

6. The method of claim 2 wherein the particular data type comprises real-time video data.

7. The method of claim 2 wherein the first platform comprises a first device for receiving the first data and a second device for receiving the second data.

8. The method of claim 7 wherein the first and second devices comprise separate hardware devices.

9. The method of claim 7 wherein the first and second devices comprise first and second applications on a single hardware platform.

10. The method of claim 2 wherein the inhibiting step further comprises the step of transmitting a second notification signal from the first interface to the second platform thereby inhibiting transmission of the first data from the second platform to the first platform via the second channel.

11. The method of claim 2 further comprising the step of, in response to the first notification signal, presenting a user associated with the first platform with an option of accepting the incoming call.

12. The method of claim 1 wherein the inhibiting step comprises the steps of:

transmitting a notification relay signal from the first platform to the second platform thereby notifying the second platform that the second channel will be unavailable for transmission of the first data; and receiving an acknowledge signal from the second platform at the first platform acknowledging receipt of the notification relay signal.

13. The method of claim 12 wherein the notification relay signal and the acknowledge signal are transmitted using network signaling resources.

14. The method of claim 1 wherein a first interface is associated with the first platform, the resuming step comprising the steps of:

in response to termination of transmission of the second data, transmitting a first notification signal from the first interface to the first platform thereby indicating that the second channel is available; and transmitting a retrieve signal from the first platform to the first interface in response to which transmission of the first data on the second channel is resumed.

15. The method of claim 14 wherein the resuming step further comprises the step of transmitting a second notification signal from the first interface to the second platform in response to which transmission of the first data from the second platform to the first platform via the second channel is resumed.

16. The method of claim 14 wherein the resuming step further comprises the steps of:

transmitting a notification relay signal from the first platform to the second platform thereby notifying the second platform that the second channel will be available for resuming transmission of the first data; and receiving an acknowledge signal from the second platform at the first platform acknowledging receipt of the notification relay signal.

17. The method of claim 16 wherein the notification relay signal and the acknowledge signal are transmitted using network signaling resources.

18. At least one computer readable medium containing program instructions for facilitating multiple data communications with a first platform using a single communication conduit, the communication conduit including first and second channels, said at least one computer readable medium comprising:

computer readable code for transmitting first data between the first platform and a second platform via the first and second channels;

computer readable code for determining whether an incoming call comprises second data of a particular type;

computer readable code for, where the incoming call comprises the second data of the particular type, inhibiting transmission of the first data via the second channel thereby enabling reception of the second data by the first platform via the second channel, the first data continuing to be transmitted via the first channel;

computer readable code for receiving the second data at the first platform via the second channel; and computer readable code for resuming transmission of the first data via the first and second channels in response to termination of transmission of the second data.

19. An apparatus for facilitating multiple data communications with a first platform using a single communication conduit, the communication conduit including first and second channels, the apparatus comprising data processing means for:

transmitting first data between the first platform and a second platform via the first and second channels;

determining whether an incoming call comprises second data of a particular type;

where the incoming call comprises the second data of the particular type, inhibiting transmission of the first data via the second channel thereby enabling reception of the second data by the first platform via the second channel, the first data continuing to be transmitted via the first channel;

receiving the second data at the first platform via the second channel; and resuming transmission of the first data via the first and second channels in response to termination of transmission of the second data.

* * * * *